US010579283B1

(12) United States Patent
Chopra et al.

(10) Patent No.: US 10,579,283 B1
(45) Date of Patent: Mar. 3, 2020

(54) ELASTIC VIRTUAL BACKUP PROXY

(71) Applicant: EMC IP Holding Company LLC, Hopkinton, MA (US)

(72) Inventors: Shelesh Chopra, Bangalore (IN); Gururaj Kulkarni, Bangalore (IN); Samad Mohammed, Bangalore (IN); Vladimir Mandic, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 200 days.

(21) Appl. No.: 15/499,742

(22) Filed: Apr. 27, 2017

(51) Int. Cl.
*G06F 3/06* (2006.01)
*G06F 9/455* (2018.01)

(52) U.S. Cl.
CPC ............ *G06F 3/0619* (2013.01); *G06F 3/065* (2013.01); *G06F 3/0683* (2013.01); *G06F 9/45558* (2013.01); *G06F 2009/45562* (2013.01); *G06F 2009/45583* (2013.01)

(58) Field of Classification Search
CPC .......... G06F 3/0619; G06F 3/06; G06F 3/065; G06F 9/45558; G06F 2009/45562; G06F 2009/45583
See application file for complete search history.

(56) References Cited

U.S. PATENT DOCUMENTS

2010/0262794 A1* 10/2010 De Beer ............. G06F 9/45533 711/162
2016/0373291 A1* 12/2016 Dornemann ............ H04L 67/28

* cited by examiner

*Primary Examiner* — Reginald G Bragdon
*Assistant Examiner* — Edward Wang
(74) *Attorney, Agent, or Firm* — Staniford Tomita LLP

(57) ABSTRACT

Rules are stored for dynamically managing virtual machine backups in a computing environment. Each rule includes a triggering condition and an action to be performed when the triggering condition is satisfied. A selection of at least one rule to apply to the environment is received. The environment is polled to detect changes. The selected at least one rule is evaluated against a detected change. Based on the evaluation, a determination is made that a triggering condition has been satisfied. An action specified in the at least one rule is performed where the action includes one of commissioning a new virtual backup proxy or decommissioning an existing virtual backup proxy.

20 Claims, 9 Drawing Sheets

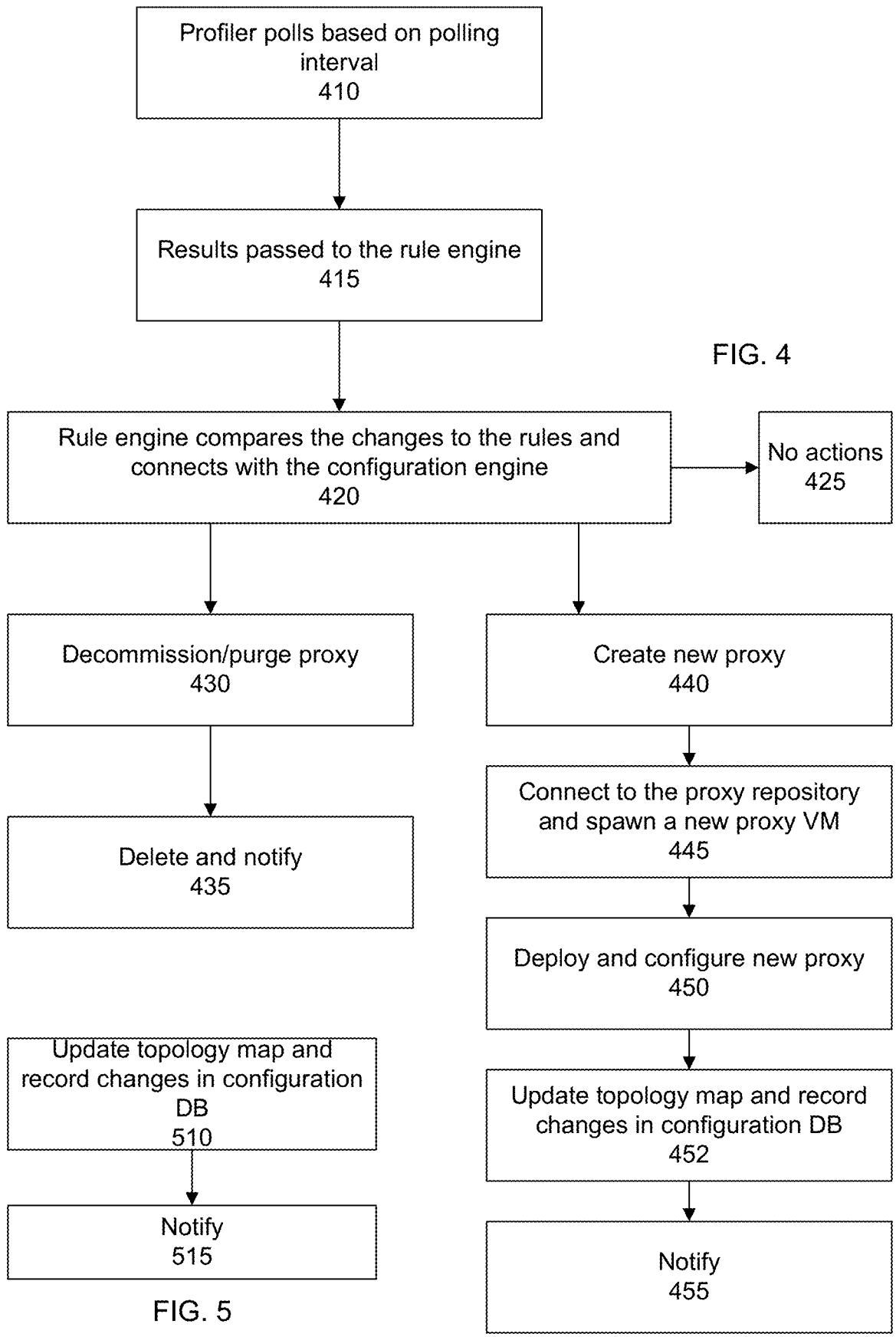

ELASTIC VIRTUAL BACKUP PROXY

TECHNICAL FIELD

Embodiments are generally directed to networked-based data backup methods, and more specifically to backing up virtual machines.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Virtual machines have emerged as one of the fundamental technologies that enterprises use in their data centers and elsewhere to process workloads, manage data, and provide services. A host hardware platform uses virtualization software to create and host any number of virtual machines. A virtual machine is a software abstraction of a real computer system. A host hardware platform may host dozens, hundreds, or even thousands of virtual machines. It is important for the enterprise to have a backup infrastructure to backup these virtual machines since data plays a crucial role in today's information-driven society.

The number of virtual machines in an environment can vary based on demand. The traditional backup infrastructure, however, is generally static. For example, during an initial deployment, a backup administrator may configure the backup infrastructure with a sufficient amount of resources to backup the deployed virtual machines according to a particular time window or other objective. These backup resources, however, do not change in response to the changing number of virtual machines in the environment. As a result, in some cases, there may be an insufficient level of resources to meet the backup objectives. In other cases the backup infrastructure may be overprovisioned with resources which is wasteful.

Therefore, there is a need for improved systems and techniques for efficiently managing the backup of virtual machines.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Replicator, and Data Domain Boost are trademarks of Dell EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 4 shows a more detailed flow of a process for elastic virtual backup proxies according to a specific embodiment.

FIG. 5 shows a flow of a process for updating the topology map and configuration according to a specific embodiment.

DETAILED DESCRIPTION

Figure 1:
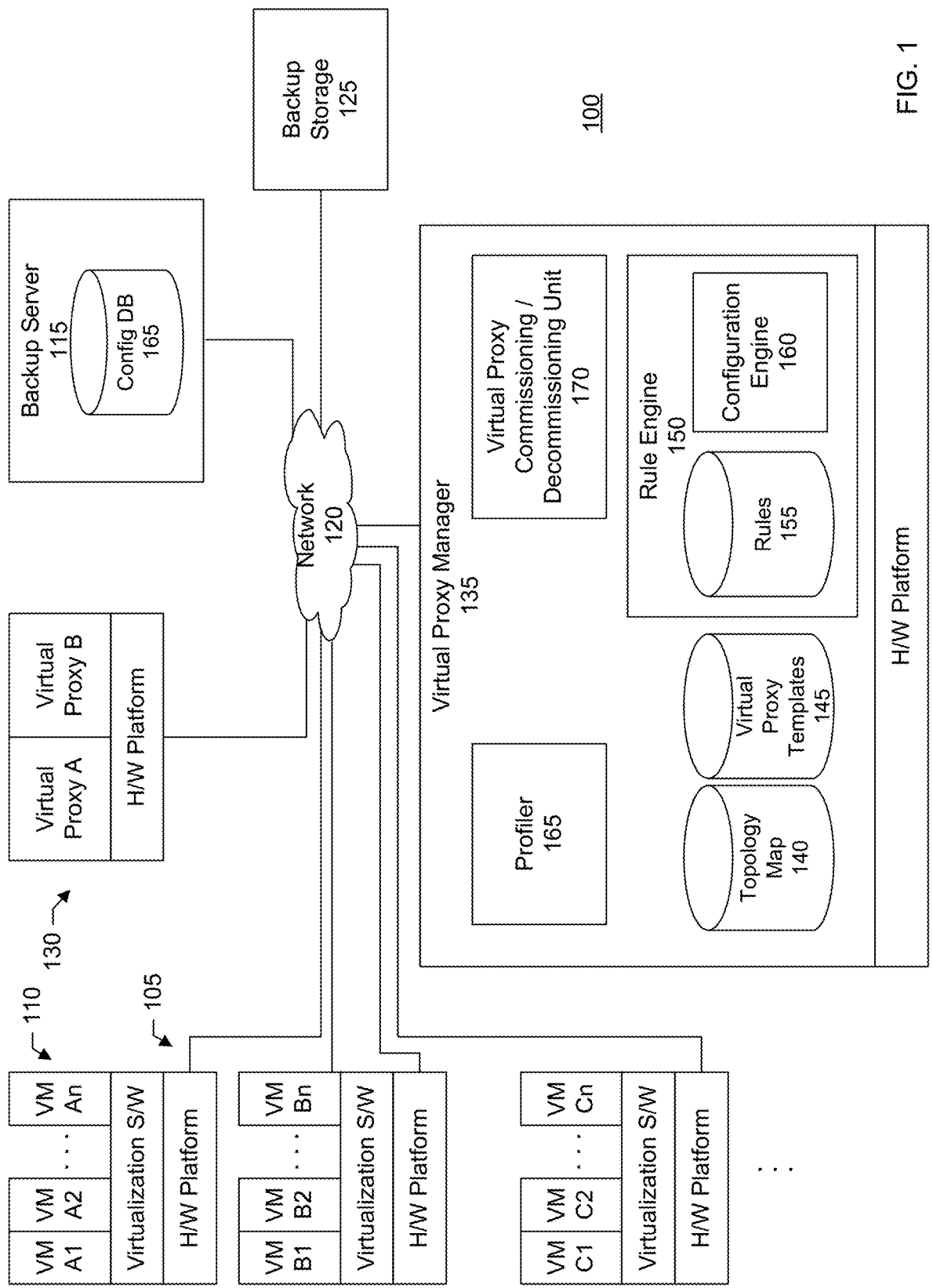
FIG. 1 is a diagram of a large-scale network implementing a system for elastic virtual backup proxies, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, a computer-readable medium, or a non-transitory computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. A "non-transitory storage medium" or "non-transitory computer-readable storage medium" may include any media that can contain, store, or maintain programs, information, and data. Examples include physical media such as, for example, electronic, magnetic, optical, electromagnetic, or semiconductor media. More specific examples of non-transitory storage medium or non-transitory computer-readable storage medium include a magnetic computer diskette such as floppy diskettes or hard drives, magnetic tape, a random access memory (RAM), a read-only memory (ROM), an erasable programmable read-only memory (EPROM), a flash drive, a compact disc (CD), or a digital video disk (DVD).

Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for backing up virtual machines. In an embodiment, there is a backup application that is used as part of a disaster recovery solution for large-scale networks. Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a system for backing up virtual machines. In system 100, there are a number of host machines 105. A host machine includes a hardware platform that may include a processor, memory, storage, network interface, and other computing hardware and software. The host may include virtualization software such as a hypervisor. The virtualization software provides an abstraction of the underlying hardware to the virtual machines and helps to ensure isolation of hosted virtual machines (VMs) 110. A host machine may host any number of virtual machines. A virtual machine is a software abstraction of a physical computer system that is installed as a "guest" on the "host" hardware platform. A virtual machine can include a guest operating system, guest applications running on the guest operating system, and virtual hardware which represents a hardware state of the virtual machine. Each virtual machine may be assigned an identifier such as an Internet Protocol (IP) address.

A network or backup server computer 115 is coupled directly or indirectly to these clients through network 120, which may be a cloud network, LAN, WAN, or other appropriate network. Network 120 provides connectivity to the various systems, components, and resources of system 100, and may be implemented using protocols such as Transmission Control Protocol (TCP) and/or Internet Protocol (IP), well known in the relevant arts. In a distributed network environment, network 120 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 100 may be backed up to secondary or backup storage 125. Backup storage includes backup media and may be located at any number of persistent storage locations and devices, such as local client storage, server storage, or network storage, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

The example shown in FIG. 1 includes any number of virtual backup proxies 130 and a virtual backup proxy manager 135. The backup server is responsible for handling administrative tasks associated with a backup job while the virtual backup proxies are responsible for retrieving production data of a virtual machine, processing the data for backup (e.g., compressing, deduplicating, or encrypting), and sending or transmitting the data to backup storage. For example, a virtual backup proxy may mount a snapshot taken of a volume of a virtual machine and roll or copy the data from the snapshot to backup storage. A virtual backup proxy, virtual proxy manager, or both may reside on a same or a different host hardware platform from the virtual machines or backup server. A virtual backup proxy may be referred to as a virtual appliance. Examples of a virtual backup proxy and backup application include vProxy as provided by VMware of Palo Alto, Calif., and NetWorker as provided by Dell EMC of Hopkinton, Mass. It should be appreciated that while some embodiments are shown and described in conjunction with vProxy and NetWorker, the systems and techniques for elastic virtual proxy management can be applied to any virtual backup proxy and backup application.

The virtual backup proxy manager is responsible for the elastic management of the number of virtual backup proxies. This may include, for example, automatically or dynamically scaling or increasing the number of virtual backup proxies, automatically or dynamically reducing the number of virtual backup proxies, and managing the lifecycle of a virtual backup proxy. In other words, rather than the number of virtual backup proxies remaining static, the number can automatically change (e.g., grow or shrink) in response one or more factors including, for example, load requirements, distribution requirements, or, more particularly, the number of virtual machines to backup, or other factors. With the elastic virtual proxy systems and techniques as described herein, a user does not have to spend time to manually deploy virtual proxies or reduce the number of deployed virtual proxies in response to changes in demand.

Backup challenges are becoming more and more complex due, in part, to service level agreements (SLAs) that are becoming even more and more demanding. There is a continuing and persistent push to reduce the backup window and make it intelligent using technology advancements. Advancements and evolutions in backups continue to be made including, for example, smart and advanced backups, snapshots, deduplication, and so forth.

Backup software and backup applications (e.g., NetWorker as provided by Dell EMC) includes intelligence, the layer in between has intelligence, and the target devices has become far more advanced all to make backups faster, better, and more efficient. However, still there are use cases that depend upon the application hosts to be intelligent in order to further realize the potential for improvement. Described herein is an example of such a use case. The rise in software defined datacenters has resulted in more and more virtualized payloads. The scale for these environments have grown exponentially. Also, the payload itself is dynamic where the user can create or purge the environments dynamically. In an embodiment, the backup process is offloaded to a proxy host which helps to alleviate the issue of utilizing production resources. A static approach, however, does not address scale and performance challenges.

Thus, in a specific embodiment, a new elastic virtual proxy may be spawned and configured based on a virtualization or topology map. As the number of clients, data sets, or both increases, elastic virtual proxies can be intelligently spawned or decommissioned. In other words, the configuration of the virtual proxies may be intelligent and dynamic rather than static.

In a specific embodiment, there is a pre-configured template of a Proxy-VM. An elastic v-proxy (virtual proxy) grows or is decommissioned based on demand as determined by, for example, load/distribution. Thin provisioning techniques may be applied to provide an optimum or improved use of the compute power. In this specific embodiment, there is a rule engine that handles spawning of one or more new elastic v-proxies based on one or more factors including a number of virtual machines (VMs) in the environment (e.g., load balancing), parallel processing (e.g., concurrent sessions), SLA types (e.g., platinum, gold, or bronze), throughputs requirements, ageing (e.g., elastic VProxy commission dates), or combinations of these.

Some disadvantages of previous approaches that are addressed by the elastic virtual backup proxy include scale and performance challenges, suboptimal utilization of infrastructure, missing or violating SLAs due to aggressive backup windows, lack of ability to leverage the overall advantage of resources on hand, lack of intelligence in load balancing and restrictions regarding what the user has configured, and high probability of errors as the user to being asked to pre-configure/pre-deploy when the whole environment is changing dynamically so much so that the backup administrator has little control.

Referring now to FIG. 1, in an embodiment, the virtual proxy manager includes a topology map 140, virtual proxy templates repository 145, rule engine 150 including a rules repository 155 and configuration engine 160, profiler 165, and virtual backup proxy commissioning/decommissioning unit 170. It should be appreciated that the blocks shown in FIG. 1 can be functional and there can be many different hardware and software configurations.

In an embodiment, the topology map provides a visual representation of the data zone. The topology map may be displayed on an electronic screen through a graphical user interface so that the user can visually comprehend the backup infrastructure. The topology map provides a pictorial representation of a data zone and the mapping between the virtual backup proxies and their assigned virtual machines.

Figure 2:
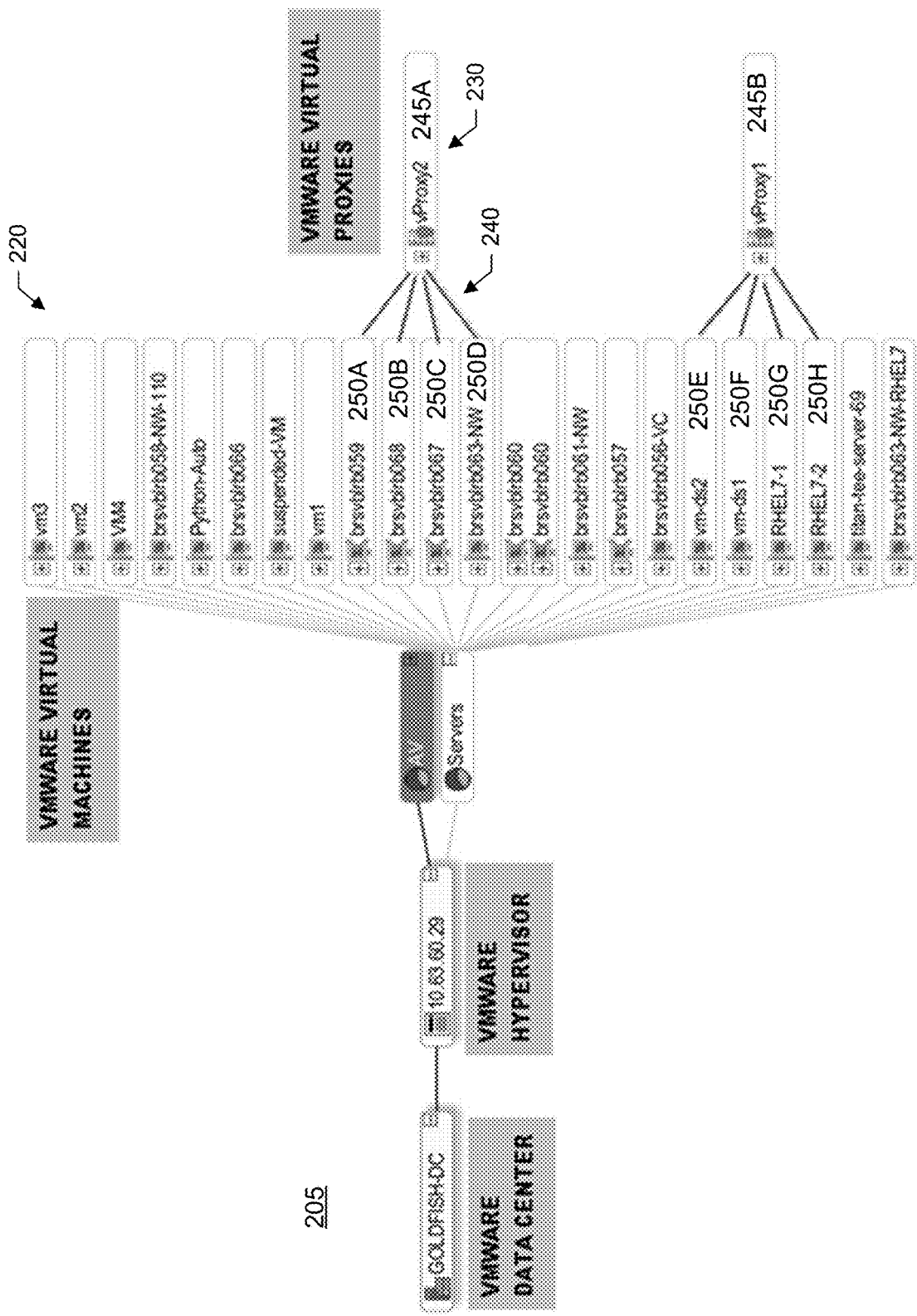
FIG. 2 shows a screenshot of an example of a topology or virtualization map.

FIG. 2 shows an example of a topology map 205. The topology map includes a set of widgets representing a datacenter, virtual machines, and virtual backup proxies assigned to backup the virtual machines. More particularly, as shown in the example of FIG. 2, there are a set of widgets 220 representing different virtual machines, a set of widgets 230 representing virtual backup proxies, and a set of graphical linkages or lines 240 identifying the particular virtual machines that a particular virtual backup proxy has been assigned to backup.

In this example, a first virtual backup proxy 245A has been assigned to first, second, third, and fourth virtual machines 250A-D. A second virtual backup proxy 245B has been assigned to fourth, fifth, sixth, seventh, and eighth virtual machines 250E-H. In the example shown in FIG. 2, the virtualization environment is provided by VMware of Palo Alto, Calif. It should be appreciated, however, that VMware is provided merely as an example of a virtualized environment and the systems and techniques described can be applied to other virtualized environments.

Referring back now to FIG. 1, in an embodiment, the proxy template repository stores fully functional templates for commissioning, provisioning, creating, or generating a virtual backup proxy. A template may include an operating system such as Microsoft Windows 2012, Windows 2012R2, Windows 2008R2, or others. A template may further include pre-installed software such as a backup application or component of a backup application (e.g., NetWorker Storage Node), other software such as anti-virus software, and so forth. The template allows a virtual backup proxy to be quickly and automatically spawned. In an embodiment, when a virtual backup proxy is to be spawned for backing up a virtual machine, the appropriate template having an operating system that matches an operating system of the virtual machine can be selected from the template repository.

The rules engine stores rules and includes logic for creating and decommissioning the elastic virtual backup proxy. Table A below shows an example of rules that may be stored in the rules database.

TABLE A

| Rule ID | Rule Name | Trigger | Action | Mapping |
| --- | --- | --- | --- | --- |
| AAA | VM_Numbers | >10 VM | New Proxy | 1:10 |
| BBB | Policy | Platinum | New Proxy | 1:10 |
| CCC | Policy | Gold | New Proxy | 1:20 |
| DDD | Policy | Bronze | New Proxy | 1:30 |
| EEE | Commission | Commission time | Decommission Proxy | >6 months |
| FFF | Concurrency | Number of Concurrent Sessions | New Proxy | 1:25 |

A first column of the table is labeled "Rule ID" and stores an identifier for a rule. A second column is labeled "Rule Name" and stores a name or type of the rule. For example, there can be a first type of rule that is applied based on a number of virtual machines. There can be a second type of rule that is applied based on a policy type or service level objective. There can be a third type of rule that is applied based on a lifespan of the virtual backup proxy. There can be a fourth type of rule that is applied based on concurrency of the virtual backup proxy.

A third column is labeled "Trigger" and specifies a triggering condition for the rule. For example, according to the sample data shown in table A above, a first rule "AAA" may be triggered when a number of virtual machines is greater than 10. Second, third, and fourth rules "BBB," "CCC," and "DDD," respectively, may specify the service level objective under which the rule is applied (e.g., platinum, gold, or bronze). Fifth rule "EEE" specifies a triggering condition of commission time (e.g., duration of time that a virtual backup proxy has been in service). Sixth rule "FFF" specifies a triggering condition based a number of concurrent sessions (e.g., number of concurrent backup sessions that a virtual backup proxy is handling or managing).

A fourth column is labeled "Action" and specifies the action to be performed when a triggering condition in a rule is satisfied. In an embodiment, the action includes one of commissioning a new virtual backup proxy or decommissioning an existing virtual backup proxy.

A fifth column is labeled "Mapping" and stores a value for the corresponding triggering condition. In embodiment, the mapping value is expressed as a ratio of a number of virtual backup proxies to a number of a virtual machines. For example, the first rule specifies a 1:10 ratio of virtual backup proxies to virtual machines. In other words, in this example, the desired number of virtual machines per virtual backup proxy is 10. The ratio values may be swapped (e.g., virtual machines to virtual backup proxy). A ratio indicates the quantitative relation between the two amounts showing the number of times one value contains or is contained within the other.

The second rule likewise specifies a 1:10 ratio of virtual backup proxies to virtual machines. In this example, the ratio corresponds to a "platinum" service level objective.

The third rule specifies a 1:20 ratio of virtual backup proxies to virtual machines. In other words, in this example, the desired number of virtual machines per virtual backup proxy is 20. In this example, the ratio corresponds to a "gold" service level objective.

The fourth rule specifies a 1:30 ratio of virtual backup proxies to virtual machines. In other words, in this example, the desired number of virtual machines per virtual backup proxy is 30. In this example, the ratio corresponds to a "bronze" service level objective.

The use of labels such as "platinum," "gold," "bronze," and so forth provides an abstraction or service level profile for the various specific conditions or rules under which virtual backup proxies may be commissioned, decommissioned, or both. The use of policies allows the user administrator to simply select the policy (e.g., "platinum," "gold," or "bronze") that best fits the enterprise's backup performance needs. For example, the administrator user may select the "platinum" policy to obtain the highest level of backup performance available. Alternatively, the administrator user may select the "bronze" policy to obtain a less expensive level of backup performance. In either case, the system can elastically grow the number of virtual proxies to meet or satisfy the selected policy requirements—and elastically shrink the number of virtual proxies to ensure efficient use of resources.

The fifth rule specifies, in this example, that a virtual backup proxy should be decommissioned after six months. For example, in some cases, an enterprise may wish to deploy a set of virtual machines on a temporary basis (e.g., 1, 2, 3, 4, 5, or 6 months, or any other time period). One or more virtual backup proxies can then be commissioned to backup those virtual machines and, upon the expiration of the time period (e.g., 6 months), the virtual backup proxies are automatically decommissioned.

The sixth rule specifies a 1:25 ratio of concurrent backup sessions per virtual backup proxy. In other words, in this example, the desired number of concurrent backup sessions per virtual backup proxy is 25. The rule allows the user to define the parallel processing that is desired (e.g., define a maximum number of current backup sessions at any point in time during a backup).

In an embodiment, the configuration engine is a subcomponent of the rule engine. The configuration engine is responsible for making all configuration changes on the backup server. Based on the rule engine and trigger, the configuration engine may obtain the rules from the rule engine and evaluate those attributes and configure the same with the required policy on the backup server.

In other words, in a specific embodiment, when a virtual backup proxy is automatically commissioned or decommissioned, the configuration engine connects to the backup server and updates a configuration database 165 accessed by the backup server. In this specific embodiment, the configuration database stores configuration information about the backup infrastructure. The configuration information may include, for example, a listing of virtual backup proxies that are available in the environment, a listing of virtual machines in the environment, virtual machine assignments identifying which virtual backup proxies have been assigned to backup which virtual machines, concurrent session information (e.g., a number of current backup sessions being managed by a virtual backup proxy), a timestamp indicating a date and time that a virtual backup proxy was placed into service, and so forth.

Consider, as an example, that a rule specifies a ratio of ten virtual machines per virtual backup proxy, but there are currently fifteen virtual machines per virtual backup proxy. A new virtual backup proxy may then be spawned in order to satisfy, meet, or comply with a ratio of ten virtual machines per virtual backup proxy. The configuration engine updates the configuration database to include the newly spawned virtual backup proxy. The backup server can access the configuration database, identify the newly spawned virtual backup proxy, and assign one or more virtual machines for backup to the newly spawned virtual backup proxy in order to comply with the ratio of ten virtual machines per virtual backup proxy.

In an embodiment, the profiler is responsible for periodically polling for the changes in the environment. A change may include an increase in a number of virtual machines in the environment, a decrease in the number of virtual machines in the environment, an increase in a number of concurrent backup sessions being managed by a virtual backup proxy, a decrease in the number of concurrent backup sessions being managed, or combinations of these.

The profiler may connect to the rule engine and configuration database as appropriate. The polling interval can be set by user with a default value. In a specific embodiment, the default value for the polling interval is once a day. The user can override the default polling interval value to set any polling frequency. In an embodiment, the profiler, at the polling time, may connect to the configuration database to obtain information about a current configuration of the environment including, for example, a number of virtual machines in the environment, a number of virtual backup proxies in the environment, a number of concurrent backup sessions being handled by the virtual backup proxies, a date and time that a virtual backup proxy was placed in to service, and so forth.

The rule engine can evaluate the current configuration information against one or more rules to determine whether a new virtual backup proxy should be commissioned or an existing virtual backup proxy decommissioned.

The determination or decision may then be passed to the virtual proxy commissioning and decommissioning unit. This unit is responsible for the commissioning and decommissioning of a virtual backup proxy. For example, in an embodiment, when a determination is made that a new virtual backup proxy should be commissioned to backup a virtual machine, the unit may identify an operating system of the virtual machine, select a virtual proxy template from the template repository having a corresponding or same operating system, and provision a new virtual backup proxy using the selected template.

Figure 3:
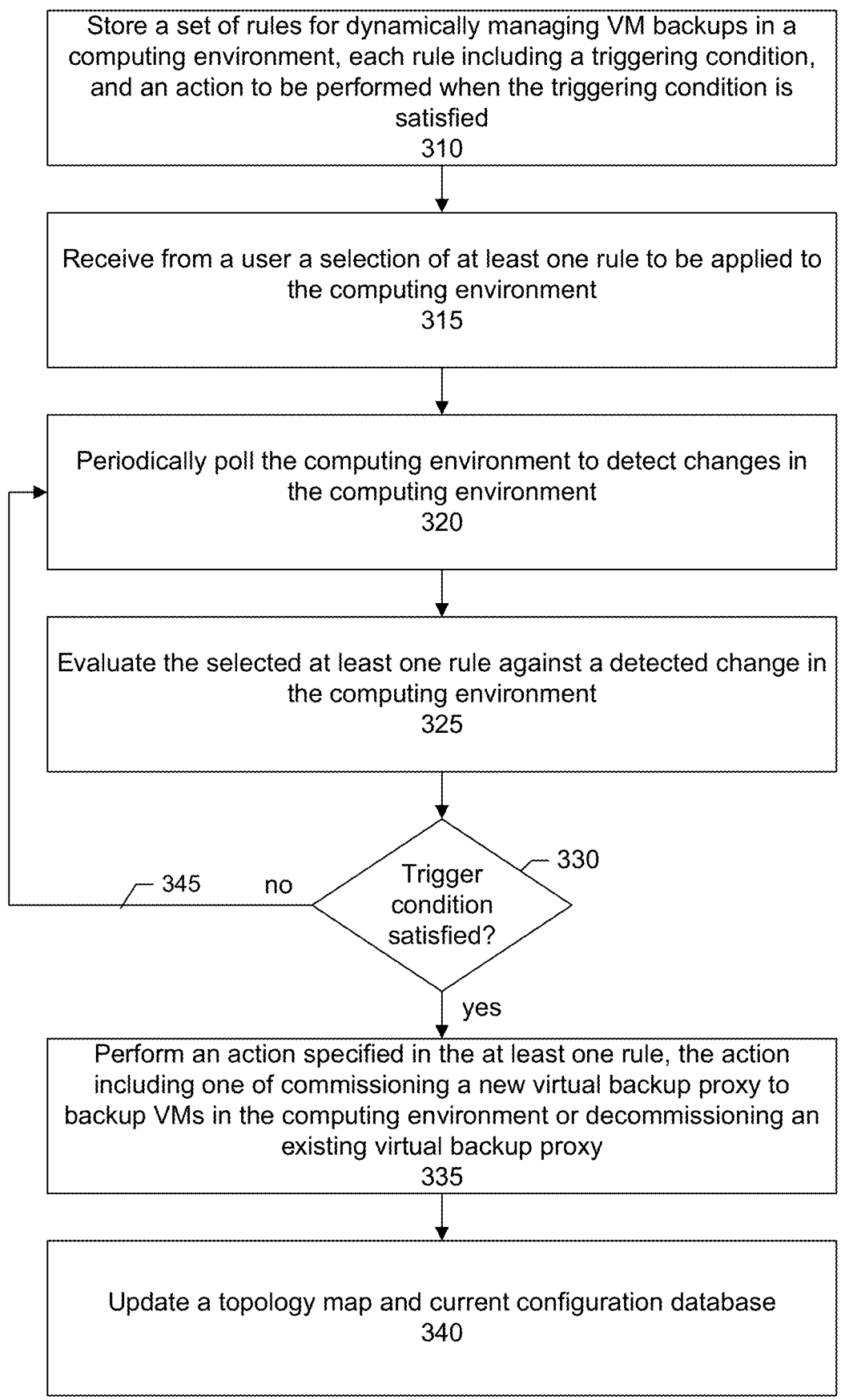
FIG. 3 shows an overall flow of a process for elastic virtual backup proxies according to a specific embodiment.

FIG. 3 shows an overall flow of a process for the elastic management of the virtual proxies. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 310, a set of rules for dynamically managing virtual machine backups in a computing environment is stored. Each rule includes a triggering condition and an action to be performed when the triggering condition is satisfied. There can be a policy type rule that identifies different levels of backup service. A particular level of service may specify a desired or allowed number of virtual machines per virtual backup proxy. There can be a concurrency type rule that specifies a desired or allowed number of concurrent backup sessions per virtual backup proxy. There can be a commission type rule that specifies a desired or allowed lifespan for a virtual backup proxy.

In a step 315, the virtual proxy manager receives from a user (e.g., administrator) a selection of at least one rule to be applied to the computing environment. For example, the user may select a policy type rule to base the number of virtual proxies on the number of virtual machines to be backed up. The user may select a concurrency type rule to base the number of virtual proxies on the number or average number of concurrent backup sessions per proxy. The user may select a commission type rule to base the number of virtual proxies on a duration of virtual proxy service.

Instead or additionally, the user may select or construct a hybrid rule. A hybrid rule includes two or more rules and a logical operator between each rule of the two or more rules. Examples of logical operators include "AND," "OR," and "NOT." For example, a user may select a policy type rule, a commission type rule, and the logical operator "AND." In this example, an action to commission a new virtual backup proxy may be performed when both rules evaluate to TRUE (e.g., number of virtual machines per virtual backup proxy exceeds ratio as specified in the policy type rule AND virtual backup proxy service age exceeds lifespan as specified in the commission type rule). As another example, the user may select a policy type rule, a commission type rule, and the logical operator "OR." In this example, an action to commission a new virtual backup proxy may be performed when at least one of the rules evaluates to TRUE (e.g., number of virtual machines per virtual backup proxy exceeds ratio as specified in the policy type rule OR virtual backup proxy service age exceeds lifespan as specified in the commission type rule).

In a step 320, the computing environment is periodically polled to detected changes in the computing environment. A change may include, for example, an increase in a number virtual machines, a decrease in the number of virtual machines, an increase in a number of concurrent backup sessions managed by a virtual backup proxy, or a decrease in the number of concurrent backup sessions managed by a virtual backup proxy.

In a step 325, the selected at least one rule is evaluated against a detected change in the computing environment. The evaluation may include, for example, comparing a current number of virtual machines per virtual backup proxy to a desired or allowed number of virtual machines per virtual backup proxy as specified in a rule. The evaluation may include comparing a current number of concurrent backup sessions per virtual backup proxy to a desired or allowed number of concurrent backup sessions per virtual backup proxy as specified in a rule. The evaluation may include comparing a duration of time that a virtual backup proxy has been in service to a desired lifespan as specified in a rule.

In a step 330, a determination is made as to whether a trigger condition of the rule is satisfied. If the trigger condition is not satisfied, the process loops back 345 to step 320 and continues to periodically poll the computing environment. Alternatively, if the trigger condition is satisfied, an action from the rule is performed. In an embodiment, the action includes one of commissioning a new virtual backup proxy or decommissioning an existing virtual backup proxy.

In a step 340, the topology map and current configuration database is updated to reflect the action that was performed (step 335). The update may include adding to the topology map and configuration database a virtual backup proxy that was commissioned. The update may include removing or deleting from the topology map and configuration database a virtual backup proxy that was decommissioned. In an embodiment, the updating allows the backup application to adjust the virtual machine and virtual proxy assignments as-needed. For example, when a new virtual backup proxy is added, one or more virtual machines assigned to an existing virtual backup proxy for backup may be reassigned to the new virtual backup proxy. When an existing virtual backup proxy is decommissioned, one or more virtual machines assigned to the existing virtual backup proxy may be reassigned to another different existing virtual backup proxy.

FIG. 4 shows a flow of a process for the elastic management of virtual backup proxies according to another specific embodiment. In a step 410, there is a profiler that polls the environment based on a polling interval. In a step 415, results from the polling are passed to the rule engine. The results may include, for example, a number of virtual machines in the environment, a number of virtual backup proxies in the environment, a number of concurrent backup sessions being managed by a virtual backup proxy, a duration of time that a virtual backup proxy has been in service, or combinations of these.

In a step 420, the rule engine compares the results or changes to one or more rules and connects with the configuration engine. If the current environment is in compliance with the one or more rules, no actions are performed (step 425). Alternatively, if the current environment is not in compliance, one or more actions may be performed. For example, if a virtual backup proxy has been in service for a time period greater than an allowed or desired lifespan, the virtual backup proxy may be decommissioned/purged (step 430) and a notification of the deletion may be generated and sent to the user.

As another example, if the number of virtual machines, concurrent backup sessions, or both exceed an allowed or desired ratio, a new virtual backup proxy may be created (step 440). Specifically, in a step 445, a connection is made to the proxy repository, a template is selected, and a new proxy VM is spawned. In a step 450, the new proxy is deployed and configured. The new virtual backup proxy may be provisioned onto an existing host that is hosting one or more existing virtual backup proxies. The new virtual backup proxy may be provisioned onto a new host that is not hosting any existing virtual backup proxies. In a step 452, the topology map is updated and changes are recorded in the configuration database. Further discussion is provided below. In a step 455, a notification of the new virtual proxy may be generated and sent to the user after the updates to the topology map have been made and changes recorded in the configuration database.

FIG. 5 shows a flow of a process after commissioning or decommissioning a virtual backup proxy. In a step 510, the topology map is updated and changes are recorded in the configuration database. In the case of a newly commissioned virtual backup proxy, the change may include adding an entry identifying the newly commissioned virtual backup proxy. The entry may include, for example, an IP address or other identifier of the virtual backup proxy, IP address or other identifier of a host machine hosting the virtual backup proxy, operating system of the virtual backup proxy, timestamp indicating a date and time that the virtual backup proxy was commissioned, or other configuration information, or combinations of these. In an embodiment, the backup application may then access the updated configuration database to modify, change, or alter the virtual machine and virtual backup proxy assignments.

For example, if a new virtual backup proxy has been commissioned, one or more virtual machines assigned to an existing virtual backup proxy may be reassigned to the newly commissioned virtual backup proxy. Instead or additionally, one or more new virtual machines provisioned into the environment after the commissioning of the new virtual backup proxy may be assigned to the new virtual backup proxy for backup. In the case of a decommissioned virtual backup proxy, the change may include deleting or removing an entry identifying the decommissioned virtual backup proxy. The change may include changing a status of the decommissioned virtual backup proxy to indicate that the virtual backup proxy is no longer available for assignments (e.g., changing status from available to not available or changing status from active to inactive), adding a timestamp indicating a date and time that the virtual backup proxy was decommissioned, or combinations of these. These changes help to ensure that the decommissioned virtual backup proxy is not assigned to any virtual machine backups. In a step 515, a notification of the update may be generated and transmitted to the administrator user.

Figure 6:
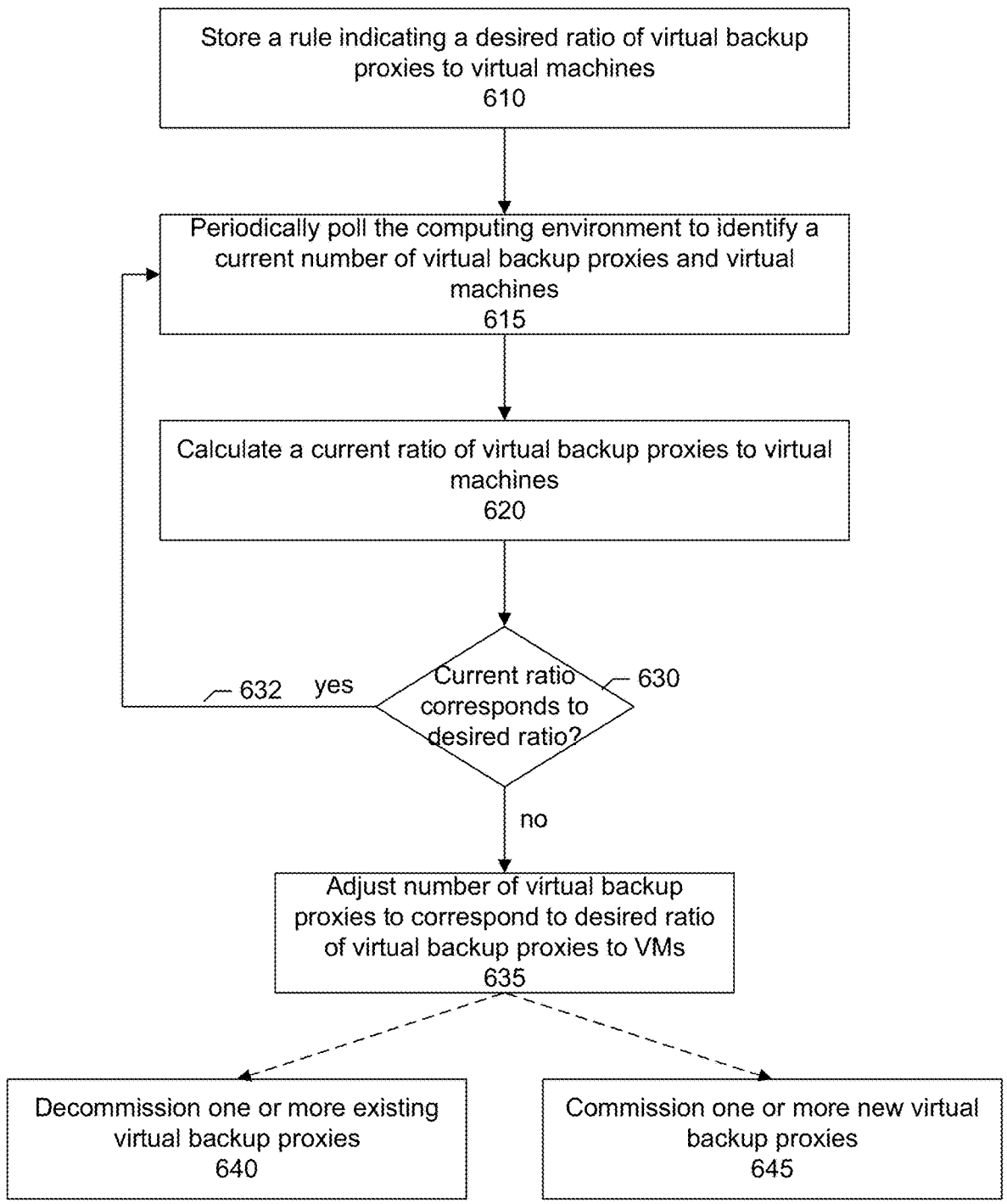
FIG. 6 shows a flow of a process for adjusting the number of virtual backup proxies based on a ratio of virtual proxies and virtual machines according to a specific embodiment.

FIG. 6 shows a flow of a process for dynamically commissioning or decommissioning virtual backup proxies based on a ratio of virtual proxies and virtual machines. In a step 610, a rule is stored indicating a desired ratio of virtual backup proxies to virtual machines.

In a step 615, the computing environment is periodically polled to identify a current number of virtual backup proxies and virtual machines. For example, at the start of production operations, an administrator may have originally or initially deployed or provisioned a certain number of virtual machines to process the various production workloads, and a certain number of virtual backup proxies to backup the virtual machines. Over time, however, the number of virtual machines may increase or decrease as the production workloads change.

In a step 620, a calculation is made of the current ratio of virtual backup proxies to virtual machines. In a step 630, a determination is made as to whether the current ratio corresponds to the desired ratio. If the current ratio corresponds to the desired ratio, the process loops back 632 to step 615 of continuing to periodically poll or monitor the environment for changes. Alternatively, if the current ratio does not correspond to the desired ratio, the number of virtual backup proxies is adjusted to correspond to the desired ratio of virtual backup proxies and virtual machines.

The adjustment may include decommissioning one or more existing virtual backup proxies (step 640) to meet or comply with the desired or allowed ratio. The adjustment may include commissioning one or more new existing virtual backup proxies (step 645) to meet or comply with the desired or allowed ratio.

In a specific embodiment, there can be a range of desired or allowed ratios. An allowed range of ratios of virtual backup proxies and virtual machines may include a lower limit and an upper limit. In this specific embodiment, a current ratio of virtual backup proxies and virtual machines is obtained. A determination is made as to whether the current ratio is between the allowed range of ratios. If the current ratio is outside the allowed range of ratios, a new virtual backup proxy may be commissioned or an existing virtual backup proxy may be decommissioned. The current ratio of virtual backup proxies and virtual machines may be determined by summing the total number of virtual backup proxies and the total number of virtual machines and obtaining a result of dividing one quantity by another.

Consider, as an example, that the allowed range of ratios specifies between 8 and 12 virtual machines per virtual backup proxy; and the current environment includes 5 virtual backup proxies and 80 virtual machines. In this example, the ratio of virtual proxies to virtual machines is 5 to 80 or 1 to 16. In other words, there is one virtual backup proxy for every 16 virtual machines. A comparison with the allowed range of ratios may thus indicate that an average number of virtual machines assigned per virtual proxy is greater than the upper limit of 12 virtual machines per virtual proxy. As a result, backup performance and throughput may not be as desired. Given that the environment includes 80 virtual machines, the number of virtual proxies needed to satisfy the upper end of the ratio range of 12 virtual machines per virtual proxy may be expressed by the following equation:

$$\frac{1}{12} = \frac{a}{80}$$

The variable "a" represents the number of virtual proxies needed. Solving for "a" results in a value of 6.7 virtual proxies or 7 virtual proxies when rounded up to the nearest integer. In this example, there are currently 5 virtual proxies. Thus, an additional 2 new virtual proxies are needed (7−5=2); and these 2 new additional virtual proxies may thus be automatically commissioned.

As another example, consider that the allowed range of ratios again specifies between 8 and 12 virtual machines per virtual backup proxy; and the current environment includes 20 virtual backup proxies and 80 virtual machines. In this example, the ratio of virtual backup proxies to virtual machines is 20 to 80 or 1 to 4. In other words, there is one virtual backup proxy for every 4 virtual machines. A comparison with the allowed range of ratios may thus indicate that there is an excess number of virtual backup proxies. As a result, the available computing resources are not being used efficiently. A virtual proxy consumes infrastructure and computing resources such as CPU, memory, storage, and so forth. When there are more virtual proxies than needed, there is a waste and inefficient use of resources.

Continuing with the example above, given that the environment includes 80 virtual machines, the number of virtual proxies needed to satisfy the lower end of the ratio range of 8 virtual machines per virtual proxy may be expressed by the following equation:

$$\frac{1}{8} = \frac{a}{80}$$

The variable "a" represents the number of virtual proxies needed. Solving for "a" results in a value of 10 virtual proxies. In this example, there are currently 20 virtual backup proxies. Thus, 10 of the 20 virtual proxies should be decommissioned in order to satisfy the lower end of the ratio.

In an embodiment, when the current ratio is outside of the allowed range of ratios, the system may determine the number of virtual backup proxies needed to be added (commissioned) or removed (decommissioned) based on the lower limit of the allowed range or the upper limit of the allowed range. The system is flexible and allows the user to base the calculation on either the lower or upper limit.

In a specific embodiment, a method includes storing a rule including a desired range of ratios of virtual backup proxies to virtual machines; obtaining a current ratio of virtual backup proxies to virtual machines; comparing the current ratio to the desired range; determining that the current ratio is outside of the desired range; if the current ratio indicates an excess number of virtual backup proxies, calculating a number of virtual backup proxies to decommission to meet the desired range; and if the current ratio indicates an insufficient number of virtual backup proxies, calculating a number of virtual backup proxies to commission to meet the desired range.

Figure 7:
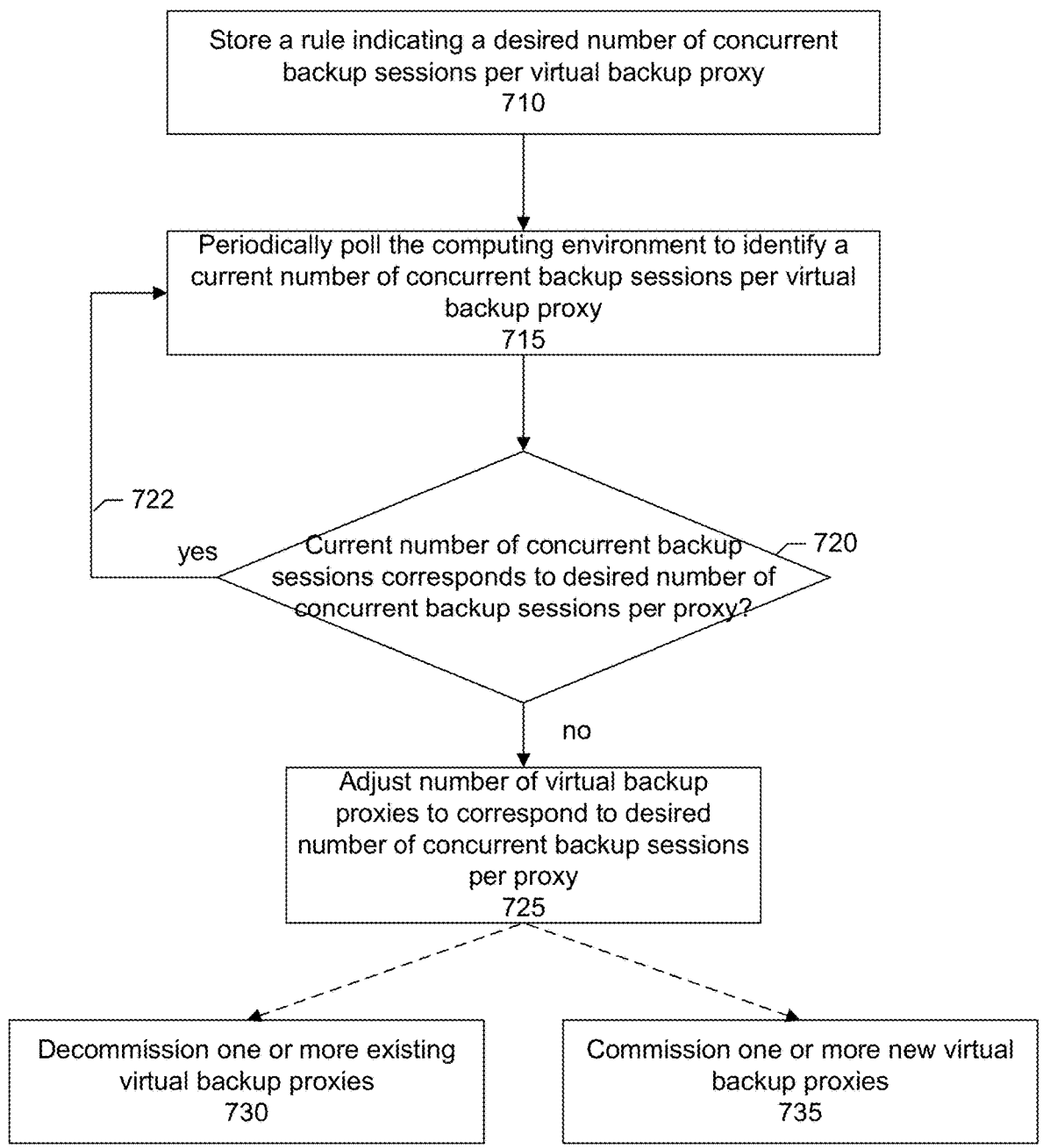
FIG. 7 shows a flow of a process for adjusting the number of virtual backup proxies based on a number of concurrent backup sessions according to a specific embodiment.

FIG. 7 shows a flow of a process for dynamically commissioning or decommissioning virtual backup proxies based on concurrent sessions. The process based on concurrent backup sessions may be similar to the process that is based on the number of virtual machines. More particularly, in a step 710, a rule is stored indicating a desired number of concurrent backup sessions per virtual backup proxy.

In a step 715, the computing environment is periodically polled to identify a current number of concurrent backup streams being managed by a virtual backup proxy. In a specific embodiment, the polling includes calculating an average number of current backup streams being managed by a virtual backup proxy. For example, an environment may include two more virtual backup proxies where each of the two or more virtual backup proxies are handling different numbers of concurrent backup sessions. An average may be obtained by summing the total number of virtual backup proxies and total number of concurrent backup sessions, and dividing the total number of concurrent backup sessions by the total number of virtual proxies to obtain an average number of backup sessions managed per virtual backup proxy.

In a step 720, a determination is made as to whether the current number of concurrent backup sessions per proxy corresponds to the desired number of concurrent backup sessions per proxy. If the current number of concurrent backup sessions per proxy corresponds to the desired number of concurrent backup sessions per proxy, the process loops back 722 to step 715 of continuing to periodically poll or monitor the environment for changes.

Alternatively, if the current number of concurrent backup sessions per proxy does not correspond to the desired number of concurrent backup sessions per proxy, the number of virtual backup proxies is adjusted to correspond to the desired number. If, for example, the virtual backup proxies are, on average, handling more concurrent sessions than desired then one or more additional or new virtual backup proxies may be commissioned (step 735) to decrease the number of concurrent sessions being handled per virtual backup proxy.

Alternatively, if the virtual backup proxies are, on average, handling fewer concurrent sessions than desired then one or more existing virtual backup proxies may be decommissioned (step 730) to increase the number of concurrent sessions being handled per remaining existing virtual backup proxy.

As discussed above, there can be a range of desired or allowed number of concurrent backup sessions handled per virtual backup proxy. For example, in a specific embodiment, a method includes storing a rule including a desired range of concurrent backup sessions handled per virtual backup proxy; obtaining a current average number of concurrent backup sessions being handled per virtual backup proxy; comparing the current average to the desired range; determining that the current average is outside of the desired range; if the current average indicates a virtual backup proxy is handling a number of current backup sessions that is greater than the desired range, calculating a number of new virtual backup proxies to commission to meet the desired range; and if the current average indicates the virtual backup proxy is handling a number of concurrent backup sessions that is less than the desired range, calculating a number of existing virtual backup proxies to decommission to meet the desired range.

In another specific embodiment, a rule may specify a number of concurrent sessions that a particular virtual proxy can handle. In this specific embodiment, when the number of concurrent backup sessions being handled by the particular backup proxy exceeds the specified number of concurrent backup sessions, a new virtual proxy is commissioned. In this specific embodiment, there can be two or more virtual backup proxies. A first rule may specify a first number of concurrent backup sessions allowed to be handled by a first virtual backup proxy of the two or more virtual backup proxies. A second rule may specify a second number of concurrent backup sessions allowed to be handled by the second virtual backup proxy of the two or more virtual backup proxies. The second number may be different from the first number. For example, the second number may be greater than or less than the first number. The system thus provides for very granular control for the elastic management of the virtual proxies.

Figure 8:
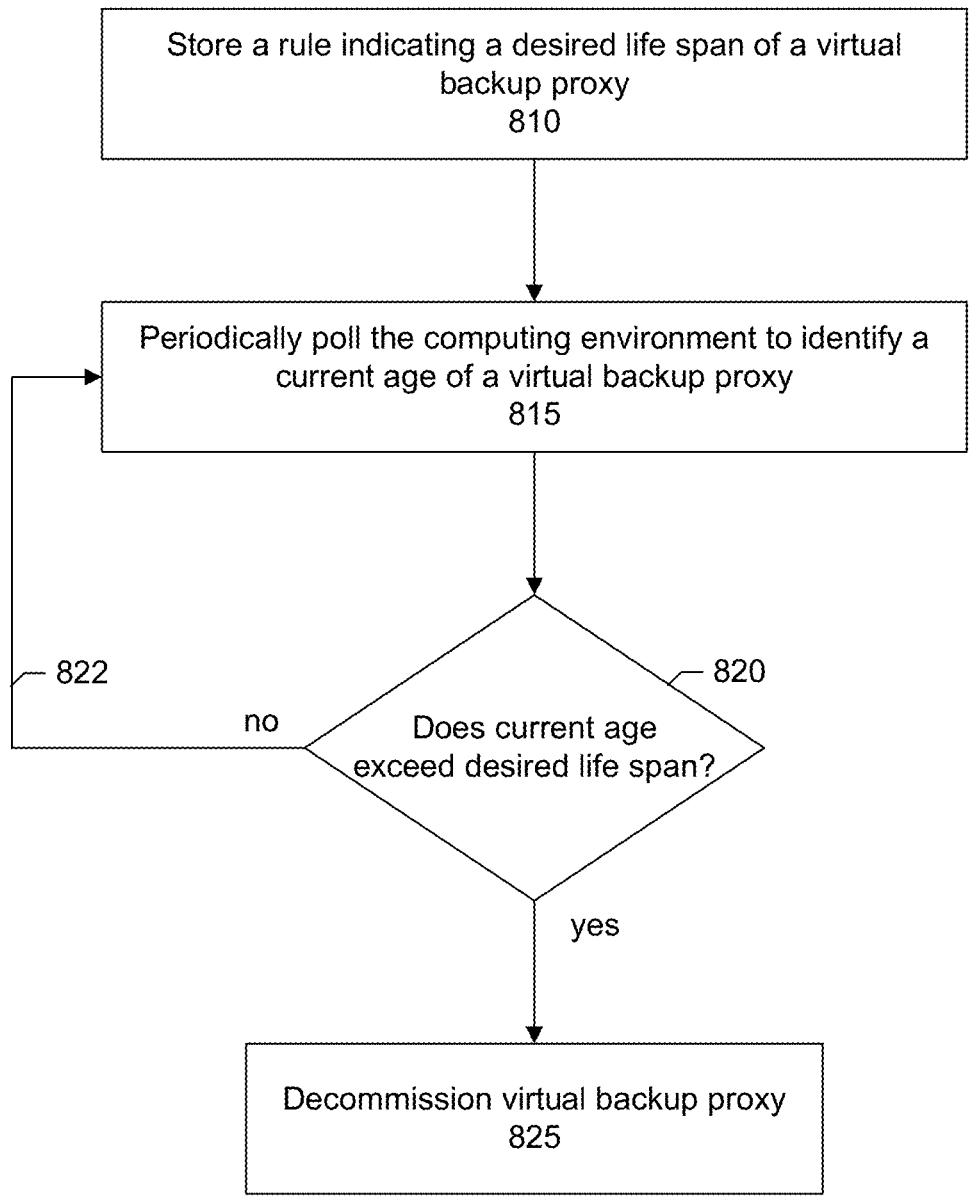
FIG. 8 shows a flow of a process for adjusting the number of virtual backup proxies based on an age of a virtual backup proxy according to a specific embodiment.

FIG. 8 shows a flow of a process for dynamically decommissioning virtual backup proxies based on a desired lifespan for a virtual backup proxy. In a step 810, a rule is stored indicating a desired lifespan of a virtual backup proxy. In a step 815, the computing environment is periodically polled to identify a current age of a virtual backup proxy. For example, the polling may include accessing a configuration or registration database storing a time indicating when a virtual backup proxy was commissioned, and determining a length of time between a current time and time of commission, the length of time thereby being an age of the virtual backup proxy.

In a step 820, a determination is made as to whether the age of the virtual backup proxy exceeds the desired lifespan as specified in the rule. If not, the process loops back 822 to step 815 of continuing to periodically poll or monitor the environment for changes. Alternatively, if the current age exceeds the specified lifespan, the virtual backup proxy is decommissioned (step 825).

The elastic management of the number of virtual backup proxies helps to improve the operational efficiency of an enterprise while also helping to ensure that backup performance or other service level objectives are met. For example, if the system determines that there are an excess number of virtual backup proxies based on the service level objectives, then one or more proxies may be decommissioned, purged, or deactivated. This can ultimately help to lower power, cooling, and footprint costs. Alternatively, if the system determines that there is an insufficient number of virtual backup proxies, then one or more proxies may be commissioned, provisioned, generated, or activated. This helps to ensure that the system is in compliance with the service level agreements.

Figure 9:
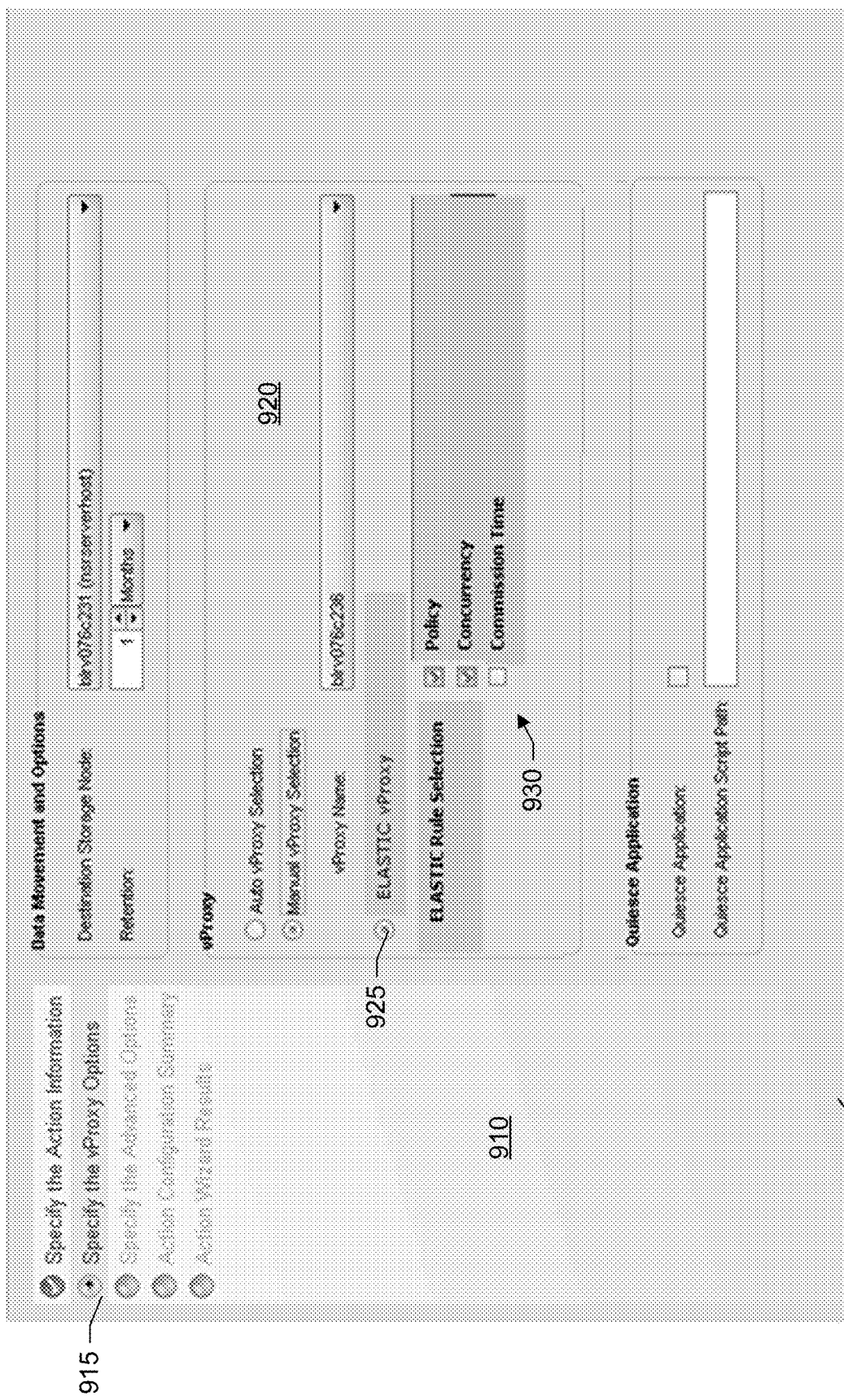
FIG. 9 shows a screenshot of an example of a dialog box for selecting the elastic virtual proxy option.

FIG. 9 shows an example of a dialog box 905 for enabling elastic virtual proxies and selecting rules for managing the number of virtual proxies. The dialog box may be displayed on an electronic screen via a graphical user interface (GUI). In the example shown in FIG. 9, the dialog box includes a left menu 910 where the user has selected an option 915 to specify the virtual proxy options. A right-hand portion of the dialog box includes a section 920 labeled "vProx" or virtual proxy. The section includes an option 925 to select "Elastic vProxy." There are a set of accompanying checkboxes 930 that the user can use to select the type of elastic rules to be applied.

In other words, in this specific embodiment, the user can select options from a user interface to enable elastic virtual proxy. Once user selects the elastic virtual proxy as the option, the user will also have the option to select the rule. Rule selection may include a single selection such as selecting the concurrency type rule. Alternatively, the user may select multiple rules such as selecting a policy type rule and a concurrency type rule. A multi-select rule may be referred to as a hybrid rule. Based on the selection of rule, the actions will be taken once the trigger for respective rule is achieved.

Figure 10:
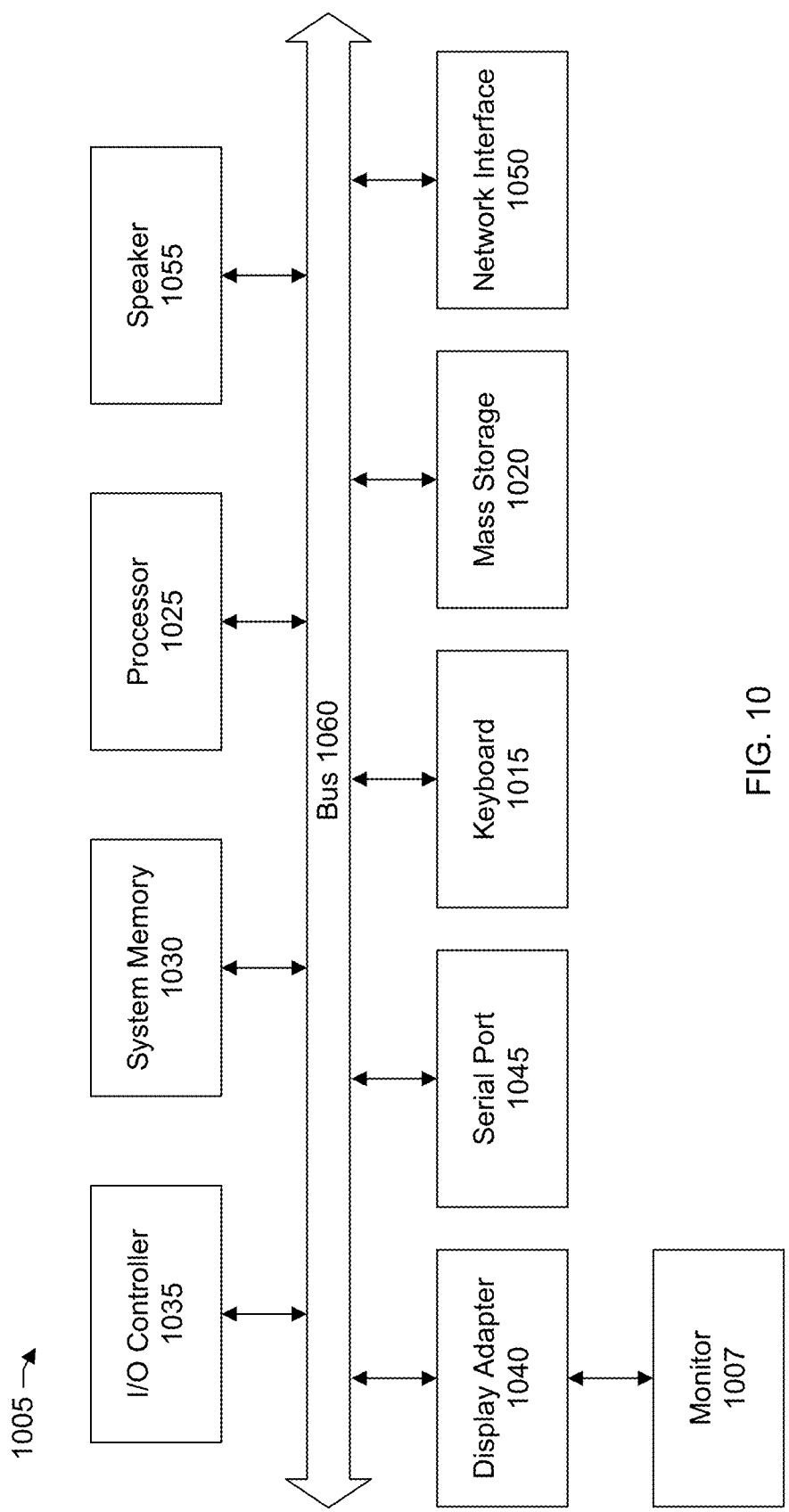
FIG. 10 shows a block diagram of a computer system suitable for use with the system, under some embodiments.

FIG. 10 shows a system block diagram of a computer system 1005 used to execute the software of the present system described herein. The computer system includes a monitor 1007, keyboard 1015, and mass storage devices 1020. Computer system 1005 further includes subsystems such as central processor 1025, system memory 1030, input/output (I/O) controller 1035, display adapter 1040, serial or universal serial bus (USB) port 1045, network interface 1050, and speaker 1055. The system may also be used with computer systems with additional or fewer subsystems. For example, a computer system could include more than one processor 1025 (i.e., a multiprocessor system) or a system may include a cache memory.

Arrows such as 1060 represent the system bus architecture of computer system 1005. However, these arrows are illustrative of any interconnection scheme serving to link the subsystems. For example, speaker 1055 could be connected to the other subsystems through a port or have an internal direct connection to central processor 1025. The processor may include multiple processors or a multicore processor, which may permit parallel processing of information. Computer system 1005 shown in FIG. 10 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In a specific embodiment, a method includes storing a plurality of rules for dynamically managing virtual machine backups in a computing environment, each rule comprising a triggering condition, and an action to be performed when the triggering condition is satisfied; receiving from a user a selection of at least one rule to be applied to the computing environment; polling the computing environment to detect changes in the computing environment; evaluating the selected at least one rule against a detected change in the computing environment; based on the evaluating, determining that a triggering condition specified in the at least one rule has been satisfied; and performing an action specified in the at least one rule, the action comprising one of commissioning a new virtual backup proxy to backup virtual machines in the computing environment or decommissioning an existing virtual backup proxy in the computing environment.

In an embodiment, the triggering condition in the at least one rule specifies a ratio comprising a number of virtual backup proxies and a number of virtual machines, and the method comprises: detecting that a current number of virtual machines in the computing environment exceeds the ratio; and commissioning one or more new virtual backup proxies to comply with the ratio.

In another embodiment, the triggering condition in the at least one rule specifies a ratio comprising a number of virtual backup proxies and a number of virtual machines, and the method comprises: detecting that a current number of virtual backup proxies in the computing environment exceeds the ratio; and decommissioning one or more existing virtual backup proxies comply with the ratio.

In another embodiment, the triggering condition in the at least one rule specifies a number of concurrent backup sessions that a virtual backup proxy is allowed to manage, and the method comprises: detecting that an existing virtual backup proxy is managing a number of concurrent backup sessions that exceeds the number of concurrent backup sessions allowed; and commissioning one or more new virtual backup proxies to reduce the number of concurrent backup sessions being handled by the existing virtual backup proxy.

In another embodiment, the triggering condition in the at least one rule specifies a threshold duration of time that a virtual backup proxy should be in service, and the method comprises: detecting that an existing virtual backup proxy has been in service for a period of time that exceeds the threshold duration; and decommissioning the existing virtual backup proxy.

Commissioning a new virtual backup proxy to backup virtual machines may include selecting, from a template repository, a virtual backup proxy template having an operating system image of an operating system that is the same as a virtual machine to be backed up.

In another specific embodiment, there is a system for elastic management of virtual backup proxies, the system comprising: a processor-based system executed on a computer system and configured to: store a plurality of rules for dynamically managing virtual machine backups in a computing environment, each rule comprising a triggering condition, and an action to be performed when the triggering condition is satisfied; receive from a user a selection of at least one rule to be applied to the computing environment; poll the computing environment to detect changes in the computing environment; evaluate the selected at least one rule against a detected change in the computing environment; based on the evaluation, determine that a triggering condition specified in the at least one rule has been satisfied; and perform an action specified in the at least one rule, the action comprising one of commissioning a new virtual backup proxy to backup virtual machines in the computing environment or decommissioning an existing virtual backup proxy in the computing environment.

In another specific embodiment, there is a computer program product, comprising a non-transitory computer-readable medium having a computer-readable program code embodied therein, the computer-readable program code adapted to be executed by one or more processors to implement a method comprising: storing a plurality of rules for dynamically managing virtual machine backups in a computing environment, each rule comprising a triggering condition, and an action to be performed when the triggering condition is satisfied; receiving from a user a selection of at least one rule to be applied to the computing environment; polling the computing environment to detect changes in the computing environment; evaluating the selected at least one rule against a detected change in the computing environment; based on the evaluating, determining that a triggering condition specified in the at least one rule has been satisfied; and performing an action specified in the at least one rule, the action comprising one of commissioning a new virtual backup proxy to backup virtual machines in the computing environment or decommissioning an existing virtual backup proxy in the computing environment.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
storing a plurality of rules, each rule comprising a triggering condition, and an action to be performed when the triggering condition is satisfied, wherein a first action in a first rule comprises automatically commissioning a new virtual backup proxy to backup virtual machines in a computing environment, and a second action in a second rule comprises automatically decommissioning an existing virtual backup proxy in the computing environment, each virtual backup proxy being a virtual machine that is hosted by a host;
receiving from a user a selection of at least one rule to be applied to the computing environment;
polling the computing environment to detect changes in the computing environment;
evaluating the selected at least one rule against a detected change in the computing environment;
based on the evaluating, determining that a triggering condition specified in the at least one rule has been satisfied; and
performing, in response to the triggering condition specified in the at least one rule being satisfied, automatically commissioning the new virtual backup proxy when the selected at least one rule is the first rule or automatically decommissioning the existing virtual backup proxy when the selected at least one rule is the second rule to dynamically manage a number of virtual backup proxies in the computing environment, the automatically decommissioning comprising purging the existing virtual backup proxy.

2. The method of claim 1 wherein the triggering condition in the at least one rule specifies a ratio comprising a number of virtual backup proxies and a number of virtual machines, and the method comprises:
detecting that a current number of virtual machines in the computing environment exceeds the ratio; and commissioning one or more new virtual backup proxies to comply with the ratio.

3. The method of claim 1 wherein the triggering condition in the at least one rule specifies a ratio comprising a number of virtual backup proxies and a number of virtual machines, and the method comprises:
  detecting that a current number of virtual backup proxies in the computing environment exceeds the ratio; and
  decommissioning one or more existing virtual backup proxies to comply with the ratio.

4. The method of claim 1 wherein the triggering condition in the at least one rule specifies a number of concurrent backup sessions that a virtual backup proxy is allowed to manage, and the method comprises:
  detecting that an existing virtual backup proxy is managing a number of concurrent backup sessions that exceeds the number of concurrent backup sessions allowed; and
  commissioning one or more new virtual backup proxies to reduce the number of concurrent backup sessions being handled by the existing virtual backup proxy.

5. The method of claim 1 wherein the triggering condition in the at least one rule specifies a threshold duration of time that a virtual backup proxy should be in service, and the method comprises:
  detecting that an existing virtual backup proxy has been in service for a period of time that exceeds the threshold duration; and
  decommissioning the existing virtual backup proxy.

6. The method of claim 1 wherein the commissioning a new virtual backup proxy to backup virtual machines comprises:
  selecting, from a template repository, a virtual backup proxy template having an operating system image of an operating system that is the same as a virtual machine to be backed up.

7. The method of claim 1 wherein automatically commissioning the new virtual backup proxy in response to the triggering condition being satisfied comprises recording, in a configuration database, a new Internet Protocol (IP) address assigned to the newly commissioned virtual backup proxy.

8. The method of claim 1 comprising:
  displaying, on an electronic screen, a dialog box comprising an option specifying elastic virtual backup proxies;
  receiving a selection of the option from a user; and
  in response to the user selecting the option for elastic virtual backup proxies, automatically changing the number of virtual backup proxies based on one or more of a plurality of factors, the plurality of factors comprising a first factor indicating a number of virtual machines to backup, a second factor indicating a backup window time, a third factor indicating a duration of time that a virtual backup proxy has been in service, a fourth factor indicating a number of concurrent backup sessions, and a fifth factor indicating a level of service specified in a service level agreement.

9. A system for elastic management of virtual backup proxies, the system comprising: a processor-based system executed on a computer system and configured to:
  store a plurality of rules for dynamically managing virtual machine backups in a computing environment, each rule comprising a triggering condition, and an action to be performed when the triggering condition is satisfied, wherein a first action in a first rule comprises automatically decommissioning an existing virtual backup proxy in the computing environment;
  poll the computing environment to detect changes in the computing environment;
  evaluate the first rule against a detected change in the computing environment;
  based on the evaluation, determine that a triggering condition specified in the first rule has been satisfied;
  perform, in response to the triggering condition specified in the first rule being satisfied, automatically decommissioning the existing virtual backup proxy, the automatically decommissioning the existing virtual backup proxy comprising purging the existing virtual backup proxy; and
  updating a graphical topology map from a first pictorial representation to a second pictorial representation, different from the first pictorial representation, wherein the first pictorial representation comprises a plurality of virtual machine widgets representing the virtual machines, a first virtual backup proxy widget representing the existing virtual backup proxy, and a plurality of graphical linkages between the virtual machine widgets and the first virtual backup proxy widget, representing an assignment of the existing virtual backup proxy to the virtual machines, and
  wherein the second pictorial representation comprises the plurality of virtual machine widgets and does not comprise the first virtual backup proxy widget because the existing virtual backup proxy has been purged.

10. The system of claim 9 wherein a second action in a second rule comprises automatically commissioning a new virtual backup proxy, a triggering condition in the second rule specifies a ratio comprising a number of virtual backup proxies and a number of virtual machines, and the processor-based system is configured to:
  detect that a current number of virtual machines in the computing environment exceeds the ratio;
  determine that the triggering condition in the second rule has been satisfied; and
  commission one or more new virtual backup proxies to comply with the ratio in response to the triggering condition in the second rule being satisfied.

11. The system of claim 9 wherein a second action in a second rule comprises automatically decommissioning an existing virtual backup proxy, a triggering condition in the second rule specifies a ratio comprising a number of virtual backup proxies and a number of virtual machines, and the processor-based system is configured to:
  detect that a current number of virtual backup proxies in the computing environment exceeds the ratio;
  determine that the triggering condition in the second rule has been satisfied; and
  decommission one or more existing virtual backup proxies to comply with the ratio in response to the triggering condition in the second rule being satisfied.

12. The system of claim 9 wherein a second action in a second rule comprises automatically commissioning a new virtual backup proxy, a triggering condition in the second rule specifies a number of concurrent backup sessions that a virtual backup proxy is allowed to manage, and the processor-based system is configured to:
  detect that an existing virtual backup proxy is managing a number of concurrent backup sessions that exceeds the number of concurrent backup sessions allowed;
  determine that the triggering condition in the second rule has been satisfied; and commission one or more new virtual backup proxies to reduce the number of concurrent backup sessions being handled by the existing virtual backup proxy in response to the triggering condition in the second rule being satisfied.

13. The system of claim 9 wherein a second action in a second rule comprises automatically decommissioning an existing virtual backup proxy, a triggering condition in the second rule specifies a threshold duration of time that a virtual backup proxy should be in service, and the processor-based system is configured to:

detect that an existing virtual backup proxy has been in service for a period of time that exceeds the threshold duration;

determine that the triggering condition in the second rule has been satisfied; and decommission the existing virtual backup proxy in response to the triggering condition in the second rule being satisfied.

14. The system of claim 9 wherein the processor-based system is configured to:

select, from a template repository, a virtual backup proxy template having an operating system image of an operating system that is the same as a virtual machine to be backed up.

15. A computer program product, comprising a non-transitory computer-readable medium having a computer-readable program code embodied therein, the computer-readable program code adapted to be executed by one or more processors to implement a method comprising:

storing first and second rules for dynamically managing virtual machine backups in a computing environment, each rule comprising a triggering condition, and an action to be performed when the triggering condition is satisfied, a first action in the first rule comprising automatically commissioning a new virtual backup proxy onto a host to backup virtual machines in the computing environment, and a second action in the second rule comprising automatically decommissioning an existing virtual backup proxy in the computing environment;

polling the computing environment to detect changes in the computing environment;

evaluating the first and second rules against a detected change in the computing environment;

when, based on the evaluation, a triggering condition specified in the first rule is satisfied, automatically commissioning the new virtual backup proxy onto the host, thereby increasing a number of virtual backup proxies in the computing environment to reduce a backup window time;

when, based on the evaluation, a triggering condition specified in the second rule is satisfied, automatically decommissioning the existing virtual backup proxy, thereby reducing the number of virtual backup proxies in the computing environment to conserve compute resources, the automatically decommissioning comprising purging the existing virtual backup proxy; and updating a graphical topology map from a first pictorial representation to a second pictorial representation, different from the first pictorial representation, wherein the first pictorial representation comprises a plurality of virtual machine widgets representing the virtual machines, a first number of virtual backup proxy widgets representing a plurality of virtual backup proxies assigned to backup the virtual machines, and a plurality of graphical linkages, between the virtual machine widgets and the virtual backup proxy widgets, representing assignments of the virtual backup proxies to the virtual machines, wherein the second pictorial representation comprises the plurality of virtual machine widgets, a second number of virtual backup proxy widgets, different from the first number of virtual backup proxy widgets, and the plurality of graphical linkages, wherein when the triggering condition specified in the first rule is satisfied, the second number of virtual backup proxy widgets is greater than the first number of virtual backup proxy widgets, and wherein when the triggering condition specified in the second rule is satisfied, the second number of virtual backup proxy widgets is less than the first number of virtual backup proxy widget.

16. The computer program product of claim 15 wherein the triggering condition in the first rule specifies a ratio comprising a number of virtual backup proxies and a number of virtual machines, and the method comprises:

detecting that a current number of virtual machines in the computing environment exceeds the ratio; and commissioning one or more new virtual backup proxies to comply with the ratio.

17. The computer program product of claim 15 wherein the triggering condition in the second rule specifies a ratio comprising a number of virtual backup proxies and a number of virtual machines, and the method comprises:

detecting that a current number of virtual backup proxies in the computing environment exceeds the ratio; and decommissioning one or more existing virtual backup proxies to comply with the ratio.

18. The computer program product of claim 15 wherein the triggering condition in the first rule specifies a number of concurrent backup sessions that a virtual backup proxy is allowed to manage, and the method comprises:

detecting that an existing virtual backup proxy is managing a number of concurrent backup sessions that exceeds the number of concurrent backup sessions allowed; and commissioning one or more new virtual backup proxies to reduce the number of concurrent backup sessions being handled by the existing virtual backup proxy.

19. The computer program product of claim 15 wherein the triggering condition in the second rule specifies a threshold duration of time that a virtual backup proxy should be in service, and the method comprises:

detecting that an existing virtual backup proxy has been in service for a period of time that exceeds the threshold duration; and decommissioning the existing virtual backup proxy.

20. The computer program product of claim 15 wherein the commissioning a new virtual backup proxy to backup virtual machines comprises:

selecting, from a template repository, a virtual backup proxy template having an operating system image of an operating system that is the same as a virtual machine to be backed up.

* * * * *